United States Patent
Matsuoka

(10) Patent No.: US 11,375,123 B2
(45) Date of Patent: Jun. 28, 2022

(54) IMAGE PROCESSING APPARATUS, IMAGE CAPTURING APPARATUS, CONTROL METHOD FOR IMAGE PROCESSING APPARATUS, AND PROGRAM STORAGE MEDIUM WITH COORDINATED DISPLAY OF IMAGE AND DISPLAY OF DISTRIBUTION INFORMATION OF EVALUATION VALUE

(71) Applicant: CANON KABUSHIKI KAISHA, Tokyo (JP)

(72) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 16/893,452

(22) Filed: Jun. 5, 2020

(65) Prior Publication Data
US 2020/0412960 A1 Dec. 31, 2020

(30) Foreign Application Priority Data
Jun. 25, 2019 (JP) .............................. JP2019-117792

(51) Int. Cl.
*H04N 5/232* (2006.01)
(52) U.S. Cl.
CPC ... *H04N 5/23296* (2013.01); *H04N 5/232123* (2018.08)
(58) Field of Classification Search
None
See application file for complete search history.

(56) References Cited

U.S. PATENT DOCUMENTS

| | | | | |
|---|---|---|---|---|
| 11,233,931 | B2* | 1/2022 | Matsuoka | H04N 5/232945 |
| 2008/0036900 | A1* | 2/2008 | Nakajima | H04N 5/232945 348/345 |
| 2013/0314580 | A1* | 11/2013 | Ju | G06T 3/40 348/333.11 |
| 2014/0253542 | A1* | 9/2014 | Jung | G06T 3/40 345/419 |
| 2015/0205457 | A1* | 7/2015 | Woo | G06F 3/0482 715/767 |
| 2016/0057341 | A1* | 2/2016 | Nakayama | G06T 7/571 348/207.1 |
| 2016/0104291 | A1* | 4/2016 | Zhou | G06T 5/50 382/173 |
| 2020/0092494 | A1* | 3/2020 | Ogawa | H04N 5/232945 |
| 2020/0154056 | A1* | 5/2020 | Mori | H04N 5/232945 |
| 2020/0177818 | A1* | 6/2020 | Kagaya | H04N 5/232945 |
| 2020/0412964 | A1* | 12/2020 | Matsuoka | H04N 5/232122 |
| 2021/0073953 | A1* | 3/2021 | Lee | G06N 3/0454 |

FOREIGN PATENT DOCUMENTS

| | | | | |
|---|---|---|---|---|
| CN | 111083380 B | * | 6/2021 | ............. H04N 5/232 |
| JP | 2008-015754 A | | 1/2008 | |
| JP | 2008-135812 A | | 6/2008 | |

* cited by examiner

*Primary Examiner* — Cynthia Segura
(74) *Attorney, Agent, or Firm* — Venable LLP

(57) ABSTRACT

A control unit provided in a digital camera acquires an image and a focus map serving as distribution information of an evaluation value corresponding to the image, and outputs the acquired image or the acquired focus map. When an operation that providing instructions for the magnification of magnification display of the image or the focus map is performed, the control unit executes output control to coordinate the display of the image and the display of the focus map with each other, in response to the above operation.

16 Claims, 12 Drawing Sheets

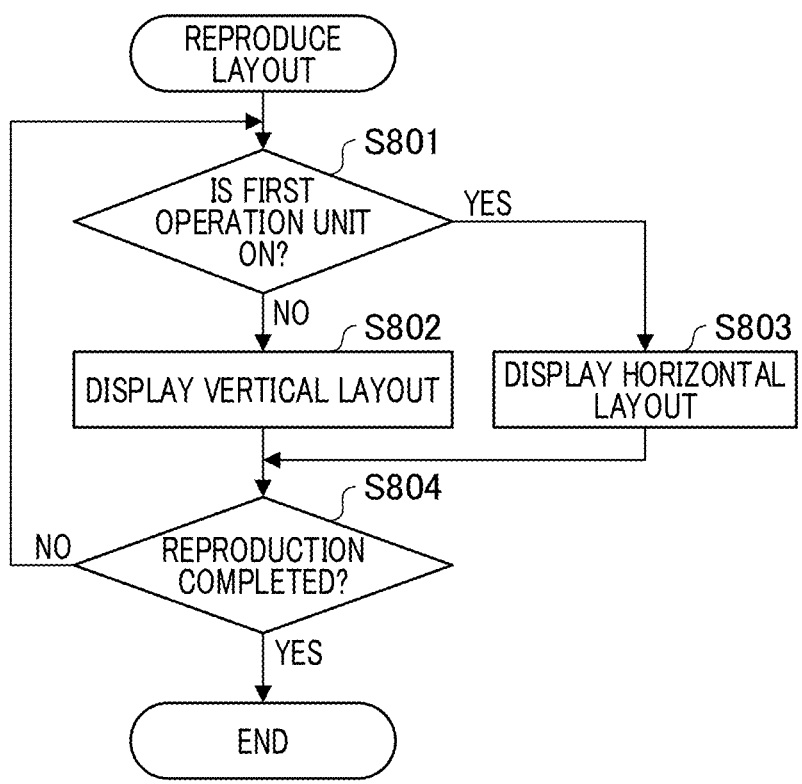

IMAGE PROCESSING APPARATUS, IMAGE CAPTURING APPARATUS, CONTROL METHOD FOR IMAGE PROCESSING APPARATUS, AND PROGRAM STORAGE MEDIUM WITH COORDINATED DISPLAY OF IMAGE AND DISPLAY OF DISTRIBUTION INFORMATION OF EVALUATION VALUE

BACKGROUND OF THE INVENTION

Field of the Invention

The present invention relates to an image processing apparatus, an image capturing apparatus, a control method for the image processing apparatus, and a program storage medium.

Description of the Related Art

As an example of an image processing apparatus, an image capturing apparatus that highlights and displays an in-focus area is disclosed. For example, Japanese Patent Application Laid-Open No. 2008-135812 discloses an image capturing apparatus that performs monochrome conversion on a color image during a manual focus operation and colors the outline and inside of an object with a color corresponding to focus position information. Japanese Patent Application Laid-Open No. 2008-15754 discloses an image capturing apparatus that detects a defocusing amount distribution in a captured image.

Since the image capturing apparatus disclosed in Japanese Patent Application Laid-Open No. 2008-135812 discards the color information of the image, the finish of the recorded image is not easily confirmed. Additionally, since the image capturing apparatus only highlights the in-focus area, the depth of field of the shooting scene cannot be confirmed. Specifically, it is impossible for the image capturing apparatus disclosed in Japanese Patent Application Laid-Open No. 2008-135812 to display a distribution of a predetermined evaluation value corresponding to an image (for example, a focus information distribution and an exposure distribution) in a predetermined display mode by being coordinated with the magnification display of the image after the image is displayed in variable magnification to be adjusted to a predetermined angle of view.

SUMMARY OF THE INVENTION

An image processing apparatus of one embodiment of the present invention comprises: at least one processor and at least one memory functioning as: a first acquisition unit configured to acquire an image; a second acquisition unit configured to acquire distribution information of an evaluation value corresponding to the image; an output unit configured to output the image or the distribution information of the evaluation value; a control unit configured to execute output control to coordinate the display of the image and the display of the distribution information of the evaluation value with each other in accordance with an operation instructing the magnification of the magnification display of the image or the distribution information of the evaluation value.

Further features of the present invention will become apparent from the following description of exemplary embodiments with reference to the attached drawings.

BRIEF DESCRIPTION OF THE DRAWINGS

FIG. 8 is a flowchart illustrating the operation process of the image processing apparatus.

DESCRIPTION OF THE EMBODIMENTS

Embodiment 1

Figure 1:
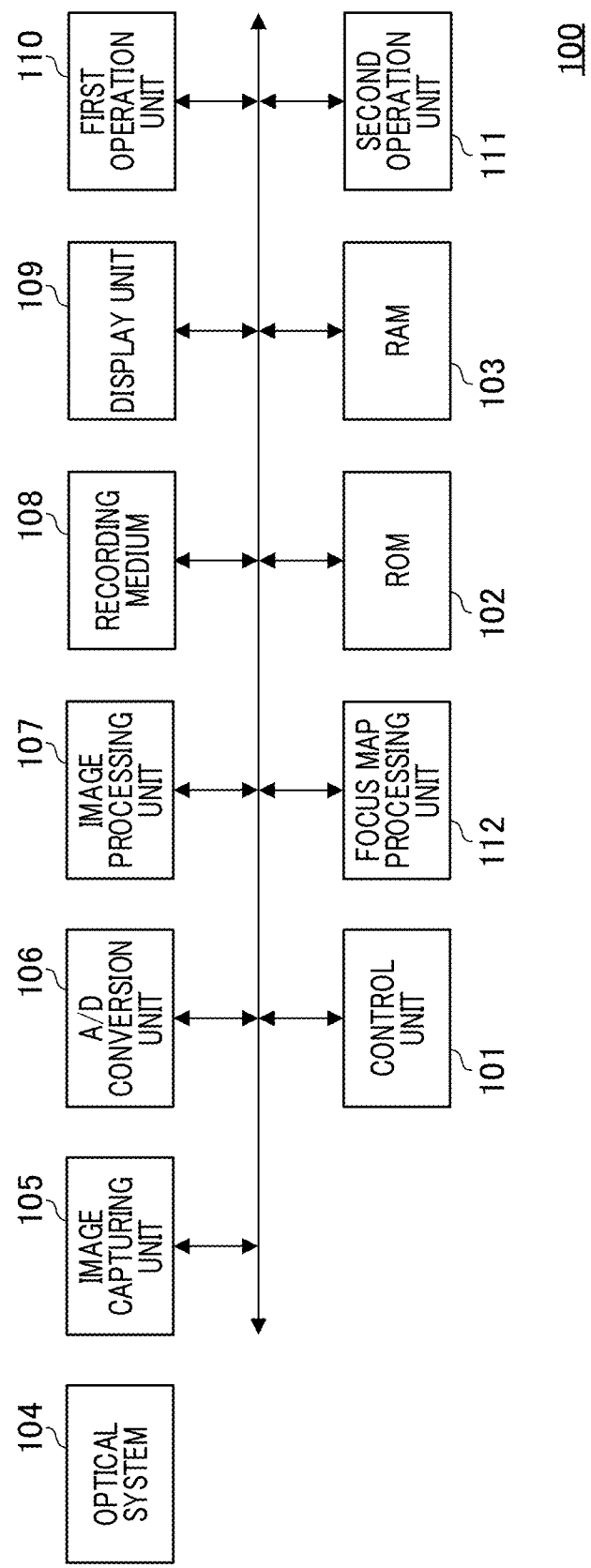
FIG. 1 illustrates a configuration example of an image processing apparatus.

FIG. 1 illustrates a configuration example of an image processing apparatus according to the present embodiment. Although FIG. 1 illustrates a digital camera that is an image capturing apparatus to serve as an example of an image processing apparatus, the scope of application of the present invention is not limited to the image capturing apparatus shown in FIG. 1. Specifically, the present invention is applicable not only to an image processing apparatus that displays an image or a focus map to be described below, but also to an image processing apparatus that outputs the image or the focus map to an external device having a display device and causes the external device to display it.

A digital camera 100 includes units from a control unit 101 to a focus map processing unit 112. The control unit 101 is, for example, a CPU that reads an operation program of each processing unit provided in the digital camera 100 from a ROM 102, deploys it in a RAM 103, and executes it. Thereby, the operation of each processing unit provided in the digital camera 100 is controlled. "CPU" is an abbreviation for "Central Processing Unit". "ROM" is an abbreviation for "Read Only Memory". "RAM" is an abbreviation for "Random Access Memory".

The ROM 102 is a rewritable nonvolatile memory and stores, for example, parameters necessary for the operation of each processing unit, in addition to the operation program of each processing unit provided in the digital camera 100. The RAM 103 is a rewritable volatile memory and is used as a temporary storage area for data output in the operation of each processing unit provided in the digital camera 100.

An imaging optical system 104 forms an image of object light on an image capturing unit 105. The image capturing unit 105 has an image capturing element such as a CCD and a CMOS sensor. "CCD" is an abbreviation for "Charge Coupled Device". "CMOS" is an abbreviation for "Complementary Metal Oxide Semiconductor". The image capturing element of the image capturing unit 105 photoelectrically converts the formed optical image and outputs an analog image signal to an A/D conversion unit 106 under the control of the control unit 101. The A/D conversion unit 106 applies A/D conversion processing to the analog image signal that has been input, and outputs digital image data that has been obtained by the A/D conversion processing to the RAM 103, and stores it. Specifically, the control unit 101 and the image capturing unit 105 function as a first acquisition unit that acquires an image.

An image processing unit 107 applies various types of image processing such as white balance adjustment, color interpolation, reduction/enlargement, and filtering to the image data stored in the RAM 103. A recording medium 108 is, for example, an attachment/detachment memory card, and records an image processed by the image processing unit 107 and an image on which A/D conversion has been performed by the A/D conversion unit 106 that are stored in the RAM 103, to serve as recorded images. A display unit 109 has, for example, a display device such as an LCD. The display unit 109 displays various types of information, for example, live view display of an image (an object image) related to the image signal acquired by the image capturing unit 105 under the control of the control unit 101. "LCD" is an abbreviation for "Liquid Crystal Display". A touch panel or the like may be built in the display unit 109. The display unit 109 is an example of an output unit that outputs an image or a focus map corresponding to the image. Additionally, the digital camera 100 may have an output unit that is separate from the display unit 109, and the display unit 109 may display the image or the focus map output by the output unit. Additionally, the digital camera 100 may have a transmission unit that transmits the image or the focus map to the external device to serve as an example of the output unit. Then, the control unit 101 may control the transmission unit to transmit the image or the focus map to the external device and execute output control for causing the external device to display the image or the focus map.

A first operation unit 110 and a second operation unit 111 are input devices for receiving user operations. For example, the first operation unit 110 and the second operation unit 111 include a character information input device such as a keyboard, a pointing device such as a mouse and a touch panel, a button, a dial, a joystick, a touch sensor, and a touch pad. The touch panel is an input device configured in a planar manner so as to be superposed on a liquid crystal monitor of the display unit 109 to output coordinate information corresponding to a touched position, touch-on, and touch-off. If the digital camera 100 is configured to display an image and the like on an external display device, the control unit 101 receives coordinate information corresponding to the touched position, and information such as touch-on and touch-off from the touch panel provided on the external display device. When the first operation unit 110 or the second operation unit 111 includes the touch panel, the control unit 101 can detect the following operations performed to the touch panel or the state:

A finger or a pen that has not touched the touch panel is touched again on the touch panel. In other words, touching has started (hereinafter, referred to as "Touch-Down").

A finger or a pen is touching the touch panel (hereinafter, referred to as "Touch-On").

A finger or a pen is moving while touching the touch panel (hereinafter, referred to as "Touch-Move").

A finger or a pen that has touched the touch panel is released. In other words, touching has ended (hereinafter, referred to as "Touch-Up").

Nothing is touching the touch panel (hereinafter, referred to as "Touch-Off").

When Touch-Down is detected, Touch-On is also detected simultaneously. Unless Touch-Up is detected after Touch-Down, normally, Touch-On continues to be detected. When Touch-Move is detected, Touch-On is detected as well. Even if Touch-On is detected, Touch-Move is not detected unless the touch position moves. When Touch-UP of all the fingers and pen that have touched is detected, the state transitions to Touch-OFF.

The control unit 101 is notified about the operation/state and the position coordinates of the touch panel touched by the finger or the pen through an internal bus, and the control unit 101 determines what operation has been performed on the touch panel based on the information for which notification has been provided. Regarding Touch-Move, the moving direction of the finger or the pen moving on the touch panel can also be determined for each vertical component and horizontal component on the touch panel based on a change in position coordinates. It is also assumed that a stroke is drawn when Touch-Up is performed on the touch panel from Touch-Down through a fixed Touch-Move. An operation that draws a quick stroke is referred to as a "flick". The flick is an operation that moves the finger quickly by a certain distance with the finger touching the touch panel, and then releasing the finger immediately, in other words, an operation that traces the touch panel by the finger quickly, like flipping the touch panel. When Touch-Move at a predetermined speed or more over a predetermined distance is detected and Touch-Up is detected immediately, it can be determined that flick has performed. Additionally, when Touch-Move at a predetermined distance or more and at a speed less than the predetermined speed is detected, it is determined that dragging has been performed. The touch panel types include a resistive film type, an electrostatic capacitance type, a surface acoustic wave type, an infrared ray type, an electromagnetic induction type, an image recognition type, and an optical sensor type, and any of these types may be used. Depending on the touch panel type, there is a touch panel type that detects that a touch has occurred due to a contact with the touch panel and there is a touch panel type that detects that a touch has occurred due to approach of the finger or the pen to the touch panel, and any of these types may be used.

In the example shown in FIG. 1, the first operation unit 110 is an operation device such as a push button and is used to provide various instructions for operations such as switching of display contents of the display unit 109. The second operation unit 111 is, for example, an operation device such as a dial member and is used to provide instructions for various operations such as the specification of display magnification and a display area of an image displayed on the display unit 109. The focus map processing unit 112 functions as a second acquisition unit that acquires a focus map serving as distribution information of an evaluation value corresponding to an image related to the image signal by analyzing the image signal acquired by the image capturing unit 105. The focus map is image information indicating a focus information distribution of an image. The focus map processing unit 112 stores the focus map in the RAM 103.

Figure 2:
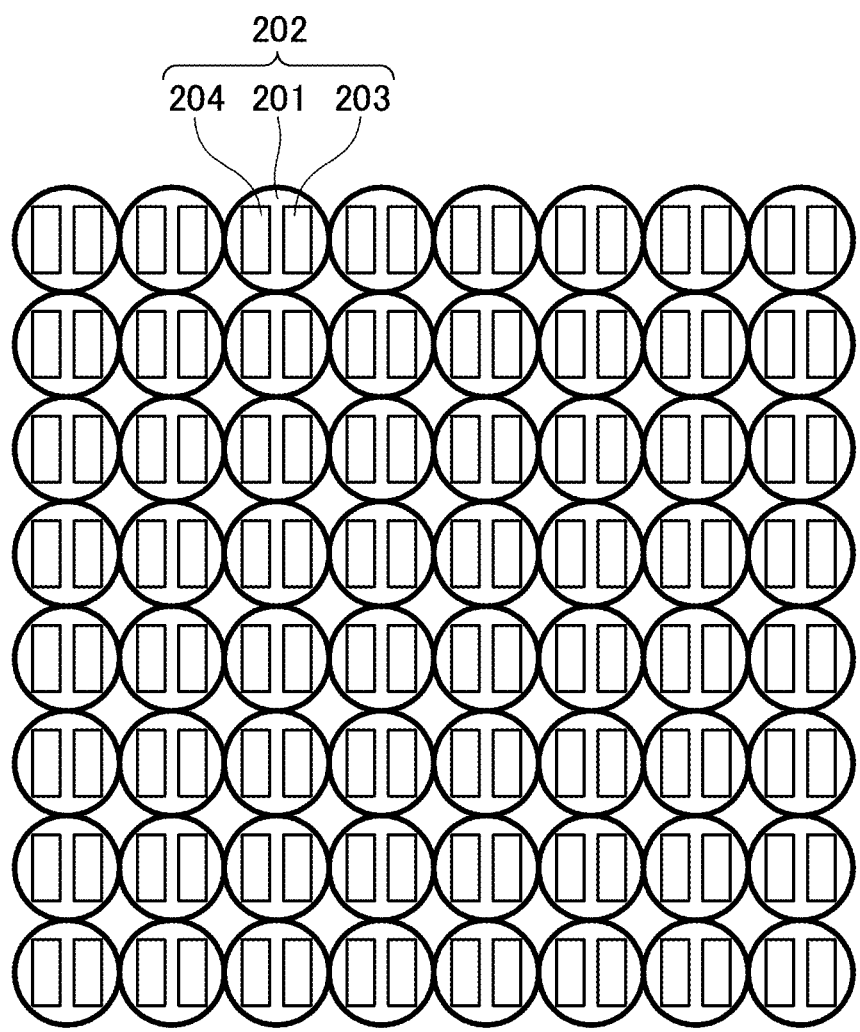
FIG. 2 illustrates a configuration example of an image capturing element.

FIG. 2 illustrates an example of a configuration of an image capturing element provided in the digital camera shown in FIG. 1. The image capturing element shown in FIG. 2 includes a plurality of pixels 202 having a plurality of photoelectric conversion units 203 and 204 (two units, in FIG. 2) for one microlens 201. The pixels 202 are regularly arrayed two-dimensionally. The photoelectric conversion units 203 and 204 included in the pixels 202 respectively perform photoelectric conversion of light that has passed through different pupil areas of the imaging optical system 104. As a result, an A image and a B image are output from the pixels 202 as a pair of images (two images).

The focus map processing unit 112 provided in a digital camera 100 outputs a distribution (phase difference distribution) related to a phase difference between the A image and the B image as a focus map under the control of the control unit 101. The focus map processing unit 112 may detect a defocusing amount distribution and output the defocusing amount distribution as a focus map by applying, for example, the technique disclosed in Japanese Patent Application Laid-Open No. 2008-15754. The focus map processing unit 112 may acquire the distribution of a shift amount, which is an amount of deviation between the A image and the B image, as the focus map. The shift amount may be expressed in units of length such as micrometers by multiplying a detection pitch (arrangement pitch of pixels of the same type). Additionally, the focus map processing unit 112 may acquire, as a focus map, a distribution of values obtained by normalizing the defocusing amount by a depth of focus (2 Fδ or 1 Fδ. F is an aperture value and δ is an allowable circle diameter of confusion).

Figure 3:
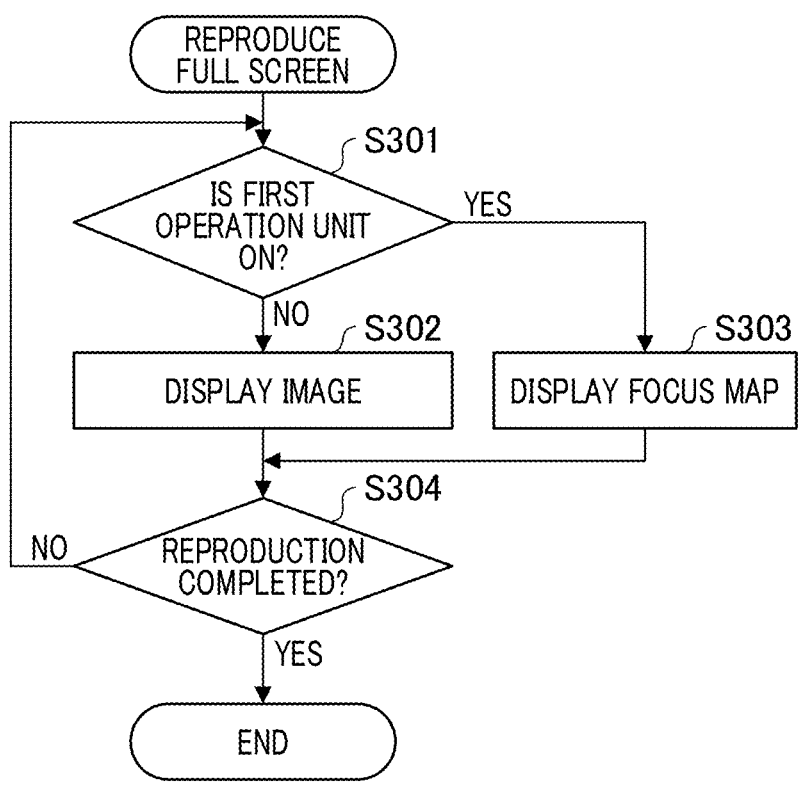
FIG. 3 is a flowchart illustrating an operation process of the image processing apparatus.

FIG. 3 is a flowchart illustrating an operation process of the image processing apparatus of Embodiment 1. In Embodiment 1, the control unit 101 reproduces the image or the focus map on the full-screen. Full-screen reproduction is reproduction processing that displays contents (image, focus map) over the entire area of the screen. In step S301, the control unit 101 determines whether or not the first operation unit 110 is in the ON state. If the first operation unit 110 is in the OFF state, the process proceeds to step S302. If the first operation unit 110 is in the ON state, the process proceeds to step S303.

In step S302, the control unit 101 controls the display unit 109 so as to display an image. Specifically, the control unit 101 executes output control for causing the display unit 109 to display an image. Then, the process proceeds to step S304. In step S303, the control unit 101 controls the display unit 109 to display the focus map serving as the distribution information of the evaluation value. Specifically, the control unit 101 executes output control for causing the display unit 109 to display the focus map. Then, the process proceeds to step S304. In step S302 or S303, the control unit 101 may execute output control to transmit the image or the focus map to the external device and cause the external device to display the image or the focus map. After the process of step S302 or step S303 in FIG. 3, the process proceeds to step S304.

In step S304, the control unit 101 determines whether or not the reproduction processing has completed. If the reproduction processing has not completed, the process proceeds to step S301. Until the reproduction is completed, the image display or the focus map display is switched in accordance with the operation of the first operation unit 110. When the reproduction processing has completed, the process ends.

Figure 4A:
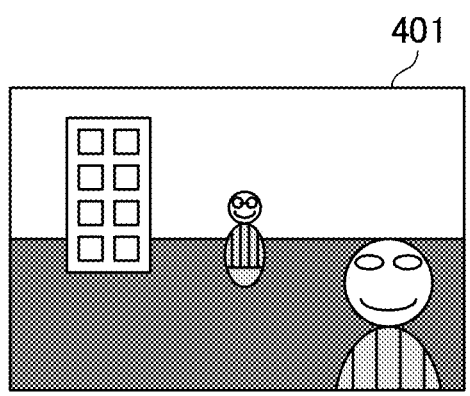
FIG. 4A and FIG. 4B illustrate an example of a displayed image and a displayed focus map.
Figure 4B:
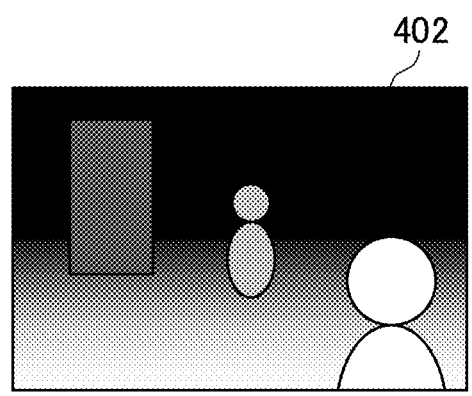

FIGS. 4A and 4B illustrate an example of a displayed image and a displayed focus map. FIG. 4A illustrate an image 401. FIG. 4B illustrate a focus map 402 corresponding to the image 401. The image 401 is a full-size image. The focus map 402 is a full-size focus map. The focus map 402 is expressed by a gray scale of continuous values in which black represents a background blur, white represents a foreground blur, and gray 50% represents the focus. The present invention is not limited to the display form shown in FIG. 4B and may be expressed by converting the gray scale value into a color value by using lookup table conversion or the like. The color value may be converted into a color such as a color contour in which blue, cyan, green, yellow, and red are expressed in descending order of the gray scale value, or may be converted into a color such that only the vicinity of 50% gray at the focus becomes one green color.

The control unit 101 sets a display magnification and a display area when the image or the focus map is displayed in accordance with an instruction by an operation of the second operation unit 111. When instructions for the full-size display magnification are provided, the control unit 101 displays the image 401 and the focus map 402, which are full-size, shown in FIG. 4. The control unit 101 executes output control to coordinate the display of the image and the display of the focus map with each other in accordance with the operation providing instructions for the magnification of magnification display of the image or the focus map.

Figure 5A:
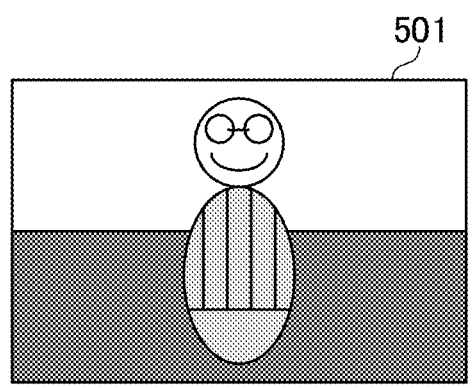
FIG. 5A and FIG. 5B illustrate a display example when a display magnification is instructed.
Figure 5B:
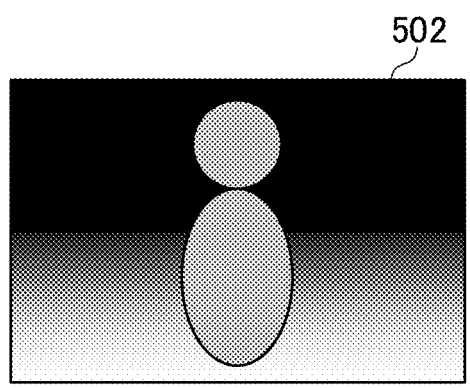

FIGS. 5A and 5B illustrate an example of the image and the focus map displayed when providing instructions for a display enlarging magnification. For example, in the case where instructions are provided for the display enlarging magnification and display area in the state where the image 401 of FIG. 4A is displayed, the control unit 101 executes the following process in step 302 of FIG. 3. As shown in FIG. 5A, the control unit 101 displays an image 501 that has been enlarged, in accordance with the instructions provided for the display magnification and the display area. In step S303 of FIG. 3, the control unit 101 displays a focus map 502 that has been enlarged in accordance with the display magnification and the display area for which instructions are provided, as shown in FIG. 5B.

Additionally, for example, when the display enlarging magnification and the display area are provided instructions in the state where the focus map 402 of FIG. 4B is displayed, the control unit 101 executes the following process in step S303 of FIG. 3. As shown in FIG. 5B, the control unit 101 displays the focus map 502 that has been enlarged in accordance with the display magnification and the display area for which instructions have been provided. Additionally, in step S302 of FIG. 3, the control unit 101 displays the image 501 that has been enlarged in accordance with the display magnification and the display area for which instructions have been provided, as shown in FIG. 5A.

The control unit 101 may change a gradation characteristic (for example, the display range) of the distribution information of the evaluation value (in the first embodiment, the focus map) in accordance with the display magnification of the image or the focus map. For example, a case is assumed in which the defocusing amount distribution serving as the focus map is converted into a color like a color contour expressed with blue, light blue, green, yellow, and red in a descending order of a grayscale value. In this case, in the enlarged focus map 502 of FIG. 5B, the control unit 101 displays the range from blue to red, for example, in the range of −3 Fδ+3 Fδ. In the full-size focus map 402 in FIG. 4B, the control unit 101 displays the range from blue to red, for example, in the range of −10 Fδ+10 Fδ. By changing the focus display range, the user can confirm a minute focus change in the enlarged focus map 502. Additionally, when the user confirms the focus of the full screen in the full-size focus map 402, the user can confirm the depth of field for the entire scene while ignoring a small blur.

According to the image processing apparatus of the present embodiment, the display positions of the image and the focus map coincide with each other regardless of whether the display magnification or the display area has been adjusted during the display of the image or the display magnification or the display area has been adjusted during the display of the focus map. Thus, the relation between the object and the focus can be easily viewed.

In the examples shown in FIGS. 5A and 5B, the control unit 101 displays both the image and the focus map in variable magnification in response to the operation that provides instructions for the magnification of the magnification display. In another example, as will be described with reference to FIG. 6 and FIG. 7, the control unit 101 may execute output control such that one of the image or the focus map is displayed in variable magnification and a magnification area is displayed in the other one.

Figure 6A:
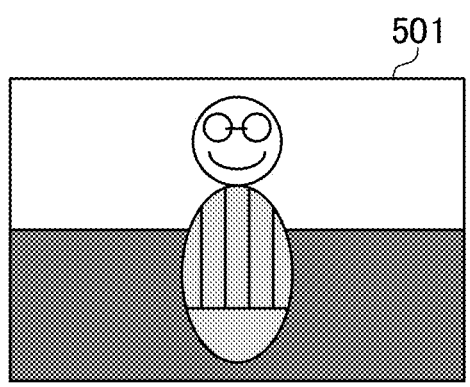
FIG. 6A and FIG. 6B illustrate an example of a display in response to an operation of a second operation unit during display of the image.
Figure 6B:
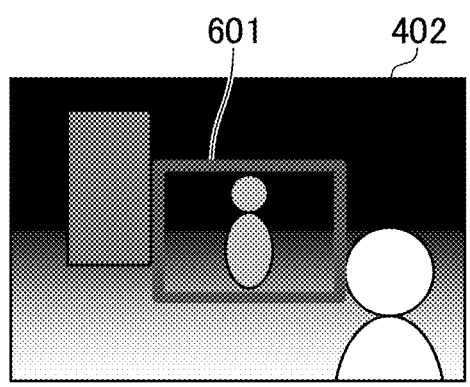

FIGS. 6A and 6B illustrate an example of a display of the image and the focus map when the display enlarging magnification and display enlarging area are specified by the operation of the second operation unit during the display of the image. As shown in FIG. 6A, in step S302 of FIG. 3, the control unit 101 displays the image 501 that has been enlarged, in accordance with the specified display magnification and display area. Subsequently, in step S303, as shown in FIG. 6B, the control unit 101 displays the full-size focus map 402 by coordinating the magnification display of the image in step S302, and displays a display area frame 601 indicating the magnification area of the image in the focus map 402. Thus, the position corresponding to the display position of the image 501 can be easily confirmed in the focus map 402.

Figure 7A:
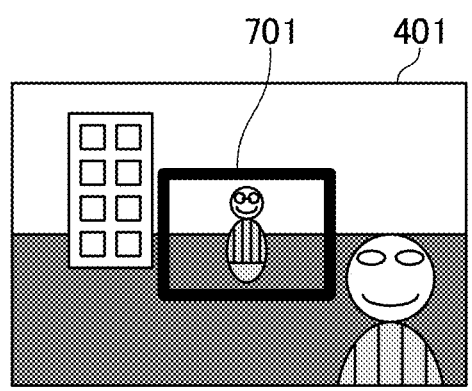
FIG. 7A and FIG. 7B illustrate an example of a display in response to an operation of the second operation unit during display of the focus map.
Figure 7B:
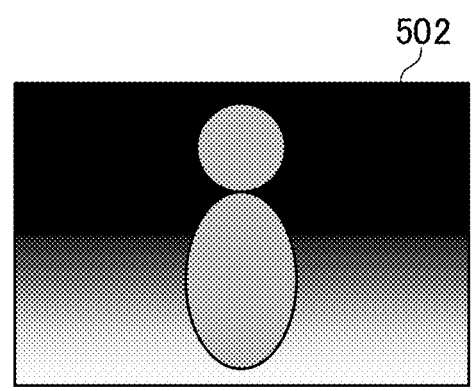

FIGS. 7A and 7B illustrate an example of the display of the image and the focus map when the display enlarging magnification and the display area are specified by the operation of the second operation unit the during display of the focus map. As shown in FIG. 7B, in step S303 of FIG. 3, the control unit 101 displays the focus map 502 that has been enlarged in accordance with the specified display magnification and display area. In step S302, as shown in FIG. 7A, the control unit 101 displays the full-size image 401 by being coordinated with the magnification display of the focus map in step S303, and displays a display area frame 701 indicating the magnification area of the focus map in the image 401. Thus, in the image 401, the position corresponding to the display position of the focus map 502 can be easily confirmed.

In the image and the focus map, the color of the display area frame may be the same or different from each other. For example, the display area frame 701 of the image shown in FIG. 7A may be a dark color, and the display area frame 601 of the focus map 402 in FIG. 6B may be a light color.

According to the image processing apparatus that executes the display shown in FIGS. 6A and 6B, it is possible to enhance the operability when the depth of field for the entire scene is confirmed by the full-size focus map while the sharpness is confirmed in the enlarged image. Additionally, according to the image processing apparatus that executes the display shown in FIGS. 7A and 7B, it is possible to enhance the operability when the composition as a photograph is confirmed in the full-size image while a minute focus change is confirmed in the enlarged focus map.

As shown in FIGS. 5 to 7 described above, the image processing apparatus of the present embodiment executes output control to coordinate the display of the image and the display of the focus map with each other in a display mode in which the magnification area of one of the image or the focus map is specified in the other one of the image and the focus map. Thus, for example, the image can be adjusted to a desired angle of view for easy viewing display, and the distribution of focus related to the magnification area in the image can be easily confirmed.

Embodiment 2

FIG. 8 is a flowchart illustrating operation processing of the image processing apparatus of the second embodiment. In Embodiment 2, the control unit 101 lays out and reproduces the image and the focus map. Layout reproduction is reproduction processing that displays contents in different areas on the same screen. More specifically, the control unit 101 causes the image and the focus map to be displayed on the same screen by them laying out vertically or horizontally.

Steps S801 and S804 are the same as steps S301 and S304 in FIG. 3. In step S802, the control unit 101 controls the display unit 109 to vertically lay out and display the image and the focus map. The vertical layout display is to perform layout and display on the same screen vertically. In step S803, the control unit 101 controls the display unit 109 to lay out and display the image and the focus map horizontally. The horizontal layout display is to perform layout and display on the same screen horizontally. In step S802 or S803, the control unit 101 may execute the output control to transmit the image or the focus map to the external device, and to cause the external device to lay out and reproduce the image or the focus map.

Figure 9A:
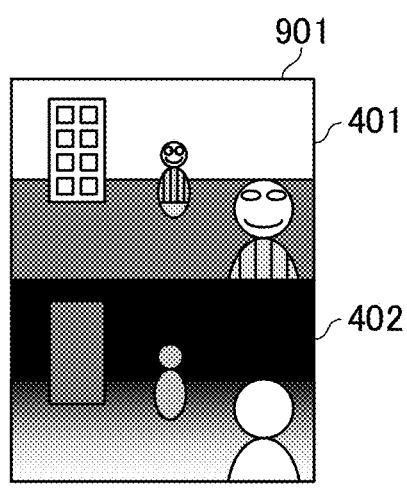
FIG. 9A and FIG. 9B illustrate an example of the displayed image and the displayed focus map.
Figure 9B:
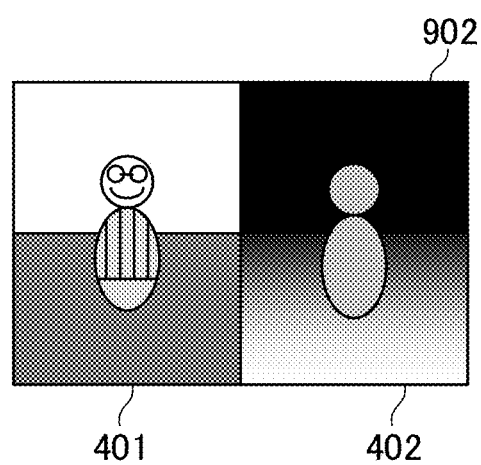

FIGS. 9A and 9B illustrate an example of the displayed image and focus map. The control unit 101 sets the display magnification and the display area when the image and the focus map are displayed in accordance with the instruction by the operation of the second operation unit 111 as in Embodiment 1. A case is assumed in which instructions have been provided for a full-size display magnification. In step S802 of FIG. 8, the control unit 101 displays an image 901 in which the full-size image 401 and the full-size focus map 402 are laid out vertically, as shown in FIG. 9A. In step S803 of FIG. 8, the control unit 101 displays an image 902 in which the full-size image 401 and a full-size focus map 402 are laid out horizontally, as shown in FIG. 9B. The vertical layout display and the horizontal layout display may be either a horizontal composition or a vertical composition.

For switching between the vertical layout display and the horizontal layout display, although, for example, the first operation unit 110 that is a push button member is used, the result for detecting the orientation of the digital camera 100 by using a vertical and horizontal orientation sensor may be used. Specifically, if the orientation of the digital camera 100 is vertical orientation, the control unit 101 performs vertical layout display. If the orientation of the digital camera 100 is horizontal orientation, the control unit 101 performs horizontal layout display. Thus, the user can switch the vertical layout display and the horizontal layout display simply by shaking the digital camera 100.

Figure 10A:
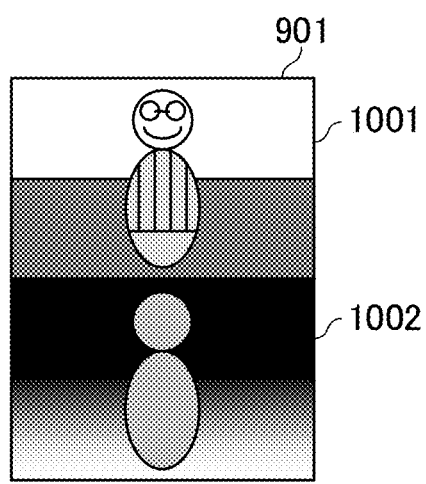
FIG. 10A and FIG. 10B illustrate an example of a display when a display enlarging magnification is instructed.
Figure 10B:
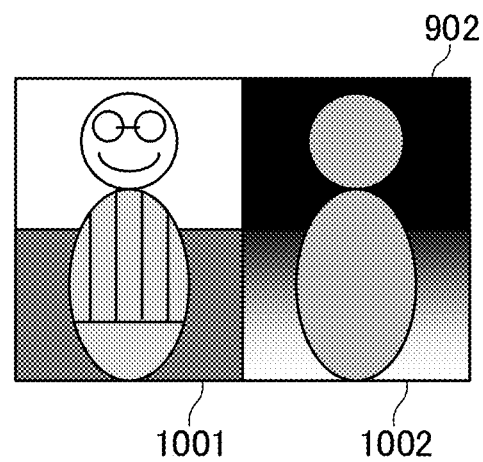

FIGS. 10A and 10B illustrate an example of the image and the focus map displayed when instruction is provided for the display enlarging magnification. The control unit 101 executes output control to coordinate the display of the image and the display of the focus map in accordance with the operation that provides instructions for the magnification of the magnifying display of the image or the focus map. FIG. 10A illustrates, for example, an example of vertical layout display in the case where the display enlarging magnification provides instructions in a state in which the image 901 shown in FIG. 9A is displayed. FIG. 10B illustrates, for example, an example of horizontal layout display in the case where instructions are provided for the display enlarging magnification in the state where the image 902 shown in FIG. 9A is displayed. As shown in FIG. 10A, the control unit 101 displays the image 901 in which an image 1001 that has been enlarged and a focus map 1002 that has been enlarged are laid out vertically. As shown in FIG. 10B, the control unit 101 displays the image 902 in which the image 1001 that has been enlarged and the focus map 1002 that has been enlarged are laid out horizontally. As in Embodiment 1, the control unit 101 may change the gradation characteristic of the focus map (for example, the display range) in accordance with the display magnification.

When the image 901 shown in FIG. 9A or the image 902 shown in FIG. 9B is enlarged by using the conventional technique, for example, simply, an area where the image 401 and the focus map 402 are in contact with each other is mainly enlarged, and thereby the enlarged display is very difficult to see. According to the image processing apparatus of the present embodiment, even in the layout reproduction, the correspondence of the display position of the image and the focus map can be easily confirmed, and thereby, the relation between the object and the focus can be easily seen. In the example shown in FIGS. 10A and 10B, although the control unit 101 changes the display magnification of both the image and the focus map, it may execute output control such that one of the image and the focus map is displayed in variable magnification and the magnification area is displayed in the other one.

Figure 11A:
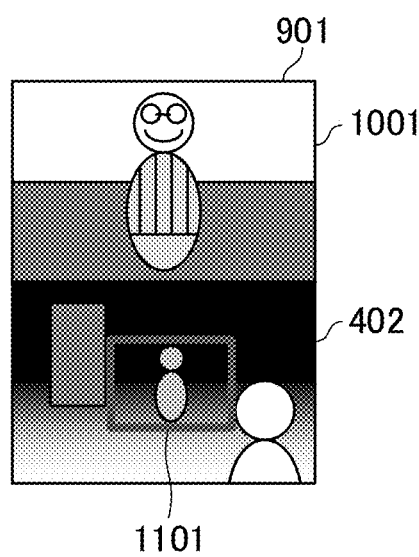
FIG. 11A and FIG. 11B illustrate an example of a display when the display enlarging magnification of the image is specified.
Figure 11B:
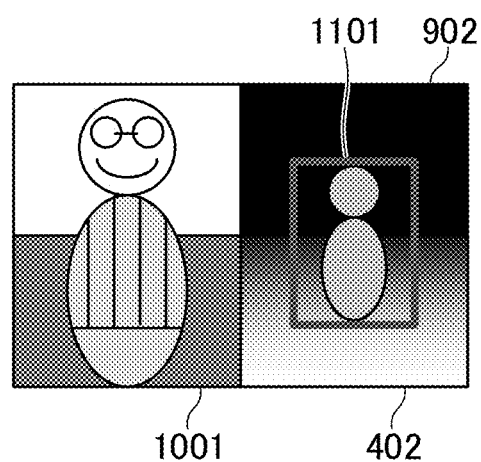

FIGS. 11A and 11B illustrate an example of display when the display enlarging magnification of the image is specified. FIG. 11A illustrates an example of a vertical layout display when the display enlarging magnification of the image 401 is specified during the display of the image 901 shown in FIG. 9A. As shown in FIG. 11A, the control unit 101 displays the image 901 in which the image 1001 that has been enlarged and the full size focus map 402 are laid out vertically. Subsequently, the control unit 101 displays a display area frame 1101 indicating the magnification range of the image in the focus map 402.

FIG. 11B illustrates an example of a horizontal layout display when the display enlarging magnification of the image 401 is specified during the display of the image 902 shown in FIG. 9B. As shown in FIG. 11B, the control unit 101 displays the image 902 in which the image 1001 that has been enlarged and the full-size focus map 402 are laid out horizontally. Subsequently, the control unit 101 displays a display area frame 1101 indicating the magnification range of the image on the focus map 402.

Figure 12A:
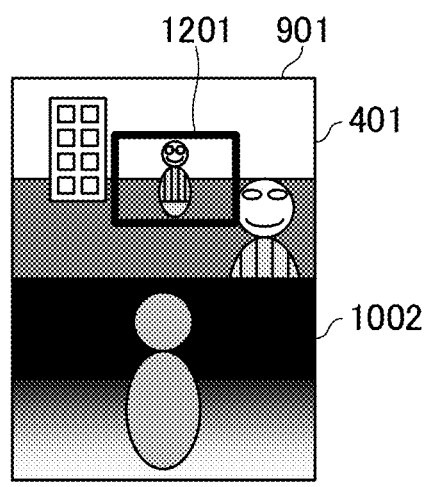
FIG. 12A and FIG. 12B illustrate an example of a display when the display enlarging magnification of the focus map is specified.
Figure 12B:
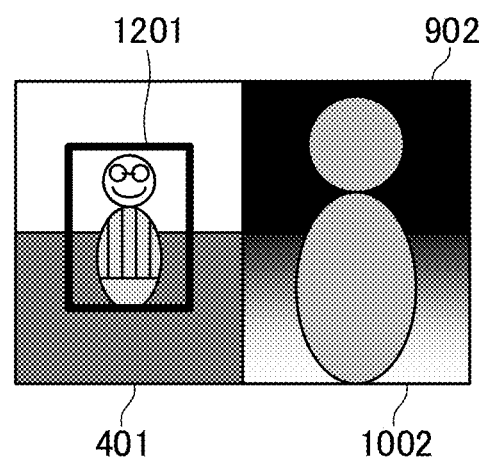

FIGS. 12A and 12B illustrate an example of display when the display enlarging magnification of the focus map is specified. FIG. 12A illustrates an example of vertical layout display when the display enlarging magnification of the focus map 402 is specified during the display of the image 901 shown in FIG. 9A. As shown in FIG. 11A, the control unit 101 displays the image 901 in which the focus map 1002 that has been enlarged and the full-size image 401 are laid out vertically. Subsequently, the control unit 101 displays a display area frame 1201 indicating the magnification range of the focus map in the image 401.

FIG. 12B illustrates an example of the horizontal layout display when the display enlarging magnification of the focus map 402 is specified during the display of the image 902 shown in FIG. 9B. As shown in FIG. 12B, the control unit 101 displays the image 902 in which the focus map 1002 that has been enlarged and the full-size image 401 are laid out horizontally. Subsequently, the control unit 101 displays the display area frame 1201 indicating the magnification range of the focus map in the image 401. According to the image processing apparatus of the second embodiment, the depth of field of the entire scene can be confirmed by the full-size focus map while confirming the sharpness by the enlarged image. Additionally, according to the image processing apparatus of Embodiment 2, the composition as a photograph can be confirmed by the full-size image while a minute focus change is confirmed in the enlarged focus map.

In the present embodiment, the second operation unit 111 is not limited to a dial member. The second operation unit 111 may be a push button member or a touch panel as described above. When the touch panel is used as the second operation unit 111, the user can instruct the display magnification and the display area of the image by performing pinch-in or pinch-out on the image. Additionally, the user can instruct the display magnification and the display area of the focus map by performing pinch-in or pinch-out on the focus map. Therefore, the user can confirm whether the magnification operation is being performed on the image or the focus map.

In the present embodiment, the first operation unit 110 is not limited to the push button member and may be a lever member or the touch panel described above. Additionally, the first operation unit 110 may be a type of switch that responds to whether or not a shooting parameter is being adjusted. The shooting parameter is, for example, a focus adjustment parameter or a diaphragm adjustment parameter.

The present invention is not limited to the embodiment in which the user directly specifies the display magnification and the display area of the image and the focus map by an operation using the second operation unit 111. The control unit 101 may display a predetermined area including an area of an object (object area) in the image in variable magnification. Additionally, the control unit 101 may determine the object area to be displayed in varied magnification based on the information about an autofocus frame indicating a focus detection area or the result of the object detection processing from the image. As the object detection processing, the control unit 101 may perform, for example, face detection, organ detection, and detection of general objects (for example, animals and vehicles). Further, the control unit 101 may automatically determine either or both of the display magnification and the display area when the magnification display is performed based on the position and the size of the autofocus frame. Thus, even if the user does not perform a complicated operation, a desired display area can be enlarged only by, for example, tapping the display unit 109. Additionally, in the present embodiment, the display examples of the image and the focus map are described in each embodiment with reference to FIG. 4 to FIG. 7 and FIG. 9 to FIG. 12. However, an embodiment may be adopted in which at least two of the image and focus map in each embodiment shown in FIG. 4 to FIG. 7 and FIG. 9 to FIG. 12 (one each from image display and focus map display) are used to switch the layout in response to the operation of the first operation unit 110 or the second operation unit 111.

In the present embodiment, although the focus map is exemplified as the distribution information of the evaluation value corresponding to the image, the distribution information of the evaluation value is not limited to the focus map. For example, the control unit 101 may acquire and display a distance distribution acquired by a TOF (Time of Flight) method or the like. The distance distribution is the depth information indicating the depth in the depth direction of the object in the image. Thus, the focal length of the optical system can be determined after the degree of focusing is confirmed. Additionally, the degree of focus can be further confirmed by normalizing the distance by the front depth of field and the rear depth of field. The control unit 101 may acquire the distance distribution by using a parallax of a multi-eye optical system in which a plurality of lenses is arranged, or by converting a defocus amount into a distance, in addition to using the TOF method. The control unit 101 may acquire the distance distribution by, for example, converting the focus map into an object distance based on the lens information and the shooting conditions. The distribution information of the evaluation value may be an image exposure information distribution, a contrast information distribution, an image blur information distribution, a distribution indicating a degree of overexposure/underexposure of an image, or the like. The image blur information distribution is acquired based on a motion vector acquired from the image data. The distribution indicating the degree of overexposure/underexposure of the image is acquired by determining the level of the image signal.

Additionally, the present invention is not limited to the embodiment in which a still image and a focus map corresponding to the still image are reproduced. An embodiment in which a moving image and a focus map corresponding to the moving image are reproduced is also within the scope of the present invention. Although the preferred embodiments of the present invention have been described above, the present invention is not limited to the above-described embodiments, and various modifications and changes are possible within the scope of the gist thereof.

Other Embodiments

The present invention may also be achieved in a process in which a program that achieves one or more of the functions of the above-described embodiments is provided to a system or a device via a network or storage medium, and one or more processors in the computer of the system or device read and execute the program. It can also be achieved by a circuit (for example, an ASIC) that archives one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-117792, filed Jun. 25, 2019 which is hereby incorporated by reference herein in its entirety.

What is claimed is:
1. An image processing apparatus comprising:
at least one processor and at least one memory functioning as a plurality of units comprising:
(1) a first acquisition unit configured to acquire an image;
(2) a second acquisition unit configured to acquire distribution information of an evaluation value corresponding to the image;
(3) an output unit configured to output the image or the distribution information of the evaluation value; and
(4) a control unit configured to execute output control to coordinate the display of the image and the display of the distribution information of the evaluation value with each other in accordance with an operation that provides instructions for magnification of magnification display of the image or the distribution information of the evaluation value,
wherein the distribution information of the evaluation value includes a focus information distribution of the image.

2. The image processing apparatus according to claim 1, wherein the control unit executes output control to display the image and the distribution information of the evaluation value in different areas on the same screen.

3. The image processing apparatus according to claim 2, wherein the control unit executes output control to display the image and the distribution information of the evaluation value on the same screen by laying them out vertically or horizontally.

4. The image processing apparatus according to claim 1, wherein the control unit executes output control to display both the image and the distribution information of the evaluation value in variable magnification.

5. The image processing apparatus according to claim 1, wherein the control unit executes output control such that one of the image and the distribution information of the evaluation value is displayed in variable magnification and a magnification area is displayed in the other one.

6. The image processing apparatus according to claim 1, wherein the control unit changes a gradation characteristic of the distribution information of the evaluation value to be displayed in accordance with the magnification of the magnification display of the image or the distribution information of the evaluation value.

7. The image processing apparatus according to claim 1, wherein the control unit executes output control to display a predetermined area including an object area in variable magnification.

8. The image processing apparatus according to claim 7, wherein the control unit determines the object area based on the information about a focus detection area or the result for object detection processing from the image.

9. The image processing apparatus according to claim 1, further comprising an image capturing element configured to output two images corresponding to light respectively passing through different pupil areas,
wherein the focus information distribution includes any one of a phase difference distribution of the two images output from the image capturing element, a distribution of a deviation amount of the two images, a distribution of a defocusing amount, or a distance distribution indicating a depth in the depth direction of the object in the image.

10. The image processing apparatus according to claim 1, further including a touch panel used for an operation that provides instructions about the magnification of the magnification display of the image or the distribution information of the evaluation value.

11. An apparatus comprising:
the image processing apparatus according to claim 1; and
a display unit configured to display the image or the distribution information of the evaluation value that has been output.

12. A control method of an image processing apparatus, the control method comprising:
acquiring an image;
acquiring distribution information of an evaluation value corresponding to the image;
outputting the image or the distribution information of the evaluation value; and executing output control to coordinate the display of the image and the display of the distribution information of the evaluation value with each other in accordance with an operation that specifies magnification of the magnification display of the image or the distribution information of the evaluation value, wherein the distribution information of the evaluation value includes a focus information distribution of the image.

13. A non-transitory storage medium on which is stored a computer program for making a computer of an image processing apparatus execute a method, the method comprising:

acquiring an image;

acquiring distribution information of an evaluation value corresponding to the image;

outputting the image or the distribution information of the evaluation value; and executing output control to coordinate the display of the image and the display of the distribution information of the evaluation value with each other in accordance with an operation that specifies magnification of the magnification display of the image or the distribution information of the evaluation value, wherein the distribution information of the evaluation value includes a focus information distribution of the image.

14. An image processing apparatus comprising:

at least one processor and at least one memory functioning as a plurality of units comprising:

(1) a first acquisition unit configured to acquire an image;

(2) a second acquisition unit configured to acquire distribution information of an evaluation value corresponding to the image;

(3) an output unit configured to output the image or the distribution information of the evaluation value; and (4) a control unit configured to execute output control to coordinate the display of the image and the display of the distribution information of the evaluation value with each other in accordance with an operation that provides instructions for magnification of magnification display of the image or the distribution information of the evaluation value, wherein the distribution information of the evaluation value includes any one of an exposure information distribution, a contrast information distribution, an image blur information distribution, and a distribution indicating a degree of overexposure/underexposure.

15. A control method of an image processing apparatus, the control method comprising:

acquiring an image;

acquiring distribution information of an evaluation value corresponding to the image;

outputting the image or the distribution information of the evaluation value; and executing output control to coordinate the display of the image and the display of the distribution information of the evaluation value with each other in accordance with an operation that specifies magnification of the magnification display of the image or the distribution information of the evaluation value, wherein the distribution information of the evaluation value includes any one of an exposure information distribution, a contrast information distribution, an image blur information distribution, and a distribution indicating a degree of overexposure/underexposure.

16. A non-transitory storage medium on which is stored a computer program for making a computer of an image processing apparatus execute a method, the method comprising:

acquiring an image;

acquiring distribution information of an evaluation value corresponding to the image;

outputting the image or the distribution information of the evaluation value; and executing output control to coordinate the display of the image and the display of the distribution information of the evaluation value with each other in accordance with an operation that specifies magnification of the magnification display of the image or the distribution information of the evaluation value, wherein the distribution information of the evaluation value includes any one of an exposure information distribution, a contrast information distribution, an image blur information distribution, and a distribution indicating a degree of overexposure/underexposure.

* * * * *